United States Patent
Peffley et al.

(10) Patent No.: US 8,814,254 B1
(45) Date of Patent: Aug. 26, 2014

(54) PROTECTIVE CAP FOR OPENING IN VEHICLE BED

(71) Applicant: Fifth Wheel Cap LLC, Slidell, LA (US)

(72) Inventors: Andrew Peffley, Slidell, LA (US); Forrest Haynes, Slidell, LA (US)

(73) Assignee: Fifth Wheel Cap LLC, Slidell, LA (US)

( * ) Notice: Subject to any disclaimer, the term of this patent is extended or adjusted under 35 U.S.C. 154(b) by 0 days.

(21) Appl. No.: 13/937,284

(22) Filed: Jul. 9, 2013

Related U.S. Application Data

(60) Provisional application No. 61/692,104, filed on Aug. 22, 2012.

(51) Int. Cl.
*B62D 33/00* (2006.01)
*B62D 25/20* (2006.01)

(52) U.S. Cl.
CPC .................................... *B62D 25/209* (2013.01)
USPC ....................................................... 296/183.1

(58) Field of Classification Search
CPC .................................................... B62D 25/209
USPC .................................... 296/183.1; 404/25, 26
See application file for complete search history.

(56) References Cited

U.S. PATENT DOCUMENTS

| | | |
|---|---|---|
| 4,948,311 A | 8/1990 | St. Pierre et al. |
| 5,267,820 A | 12/1993 | Sturtevant |
| 5,489,173 A | 2/1996 | Hofle |
| 5,618,140 A | 4/1997 | Okland |
| 5,673,956 A | 10/1997 | Emery |
| 5,738,471 A | 4/1998 | Zentner et al. |
| 6,662,490 B1 | 12/2003 | Aesch, Jr. |
| 6,682,257 B1 | 1/2004 | Zappe |
| 6,929,309 B1 * | 8/2005 | Radu et al. ................. 296/146.7 |
| 7,025,524 B2 | 4/2006 | Vitoorapakorn et al. |
| 7,175,377 B2 | 2/2007 | Womack et al. |
| 7,390,043 B2 | 6/2008 | Kraus |
| 7,401,995 B2 | 7/2008 | Senakiewich, II |
| 7,594,478 B2 | 9/2009 | Karnes et al. |
| 7,594,787 B2 | 9/2009 | Womack et al. |
| 7,788,853 B2 * | 9/2010 | Narimatsu et al. ............. 49/502 |
| 7,797,892 B2 | 9/2010 | Cannistraro et al. |
| 7,836,659 B1 * | 11/2010 | Barnes ........................ 52/742.14 |
| 8,063,317 B2 * | 11/2011 | Bowman ....................... 174/483 |
| 2003/0034633 A1 * | 2/2003 | Belinky ........................ 280/507 |
| 2003/0224198 A1 | 12/2003 | Cuyler et al. |
| 2004/0113390 A1 | 6/2004 | Broussard, III |
| 2007/0183860 A1 | 8/2007 | Smith |
| 2010/0187855 A1 * | 7/2010 | Kitajima et al. ........... 296/146.7 |

* cited by examiner

*Primary Examiner* — Lori Lyjak
(74) *Attorney, Agent, or Firm* — Marsh Fischmann & Breyfogle LLP; Jonathon A. Szumny

(57) ABSTRACT

A cap that is adapted to be selectively inserted into one or more receiver openings (e.g., receiver openings for gooseneck and fifth-wheel hitch assemblies) in a vehicle bed (e.g., pickup truck bed) and selectively secured to the bed to limit or inhibit the introduction of moisture, debris, or other elements into the receiver opening while facilitating the movement of objects (e.g., equipment, boxes) across the bed liner.

20 Claims, 7 Drawing Sheets

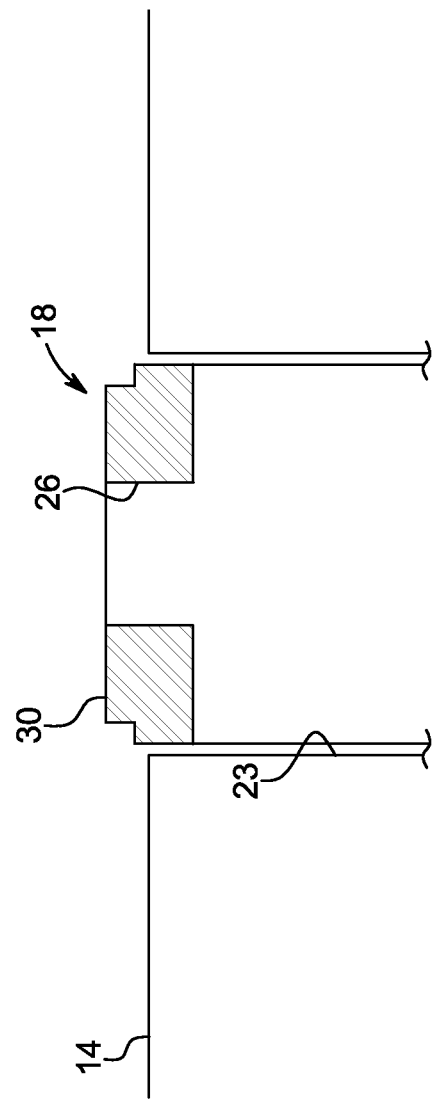

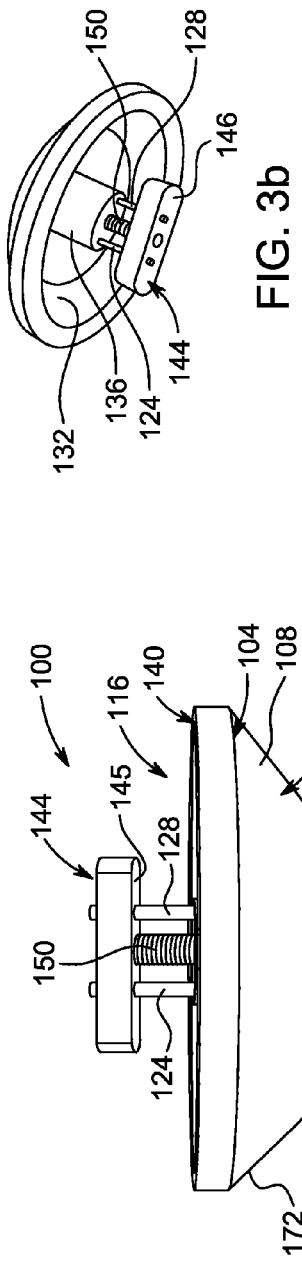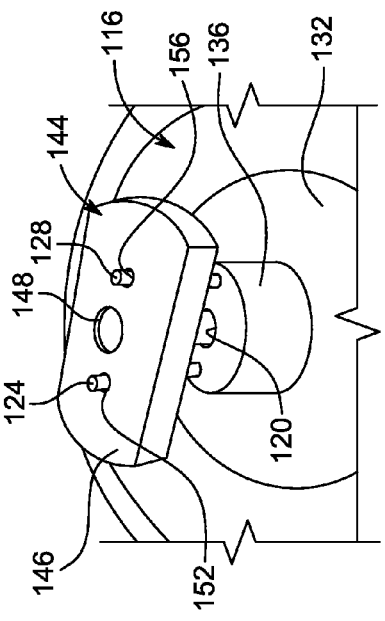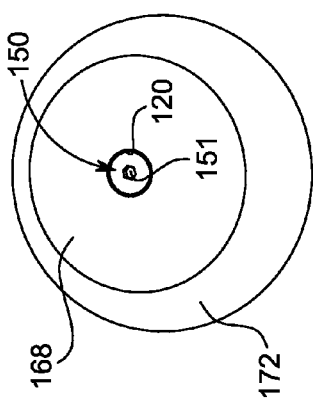

PROTECTIVE CAP FOR OPENING IN VEHICLE BED

CROSS REFERENCE TO RELATED APPLICATIONS

This application claims priority from U.S. Patent Application No. 61/692,104, entitled "PROTECTIVE CAP FOR OPENING IN VEHICLE BED," and filed on Aug. 22, 2012, the entirety of which is hereby incorporated herein by reference as if set forth in full.

FIELD OF THE INVENTION

This invention generally relates to fittings insertable within vehicle beds or bed liners and, more particularly, to a protective cap that may be inserted into a hole or receiver opening within a vehicle bed and secured to a portion of the vehicle to protect the receiver and opening from the elements while facilitating the movement of equipment and other objects across the vehicle bed substantially free of binding or catching on the cap.

BACKGROUND OF THE INVENTION

Towing is the process of pulling or drawing behind a chain, line, bar or some other form of coupling and can be performed by virtually any type or form of vehicle. Many vehicles come with some sort of tow or trailer hitch (e.g., ball, receiver, or the like) bolted or secured to the chassis at the rear of the vehicle that is adapted to couple with a corresponding component of a trailer or other device to allow the same to be pulled by the vehicle.

To pull larger loads, vehicles such as pickup trucks and tractors are often equipped with gooseneck and/or fifth wheel hitch assemblies or couplings that are anchored through the bed of the truck or tractor via corresponding receivers. A gooseneck hitch assembly includes a hitch ball that is secured via any appropriate frame through corresponding receivers to the vehicle bed. The hitch ball is adapted to be received by a corresponding opening of a gooseneck trailer. A fifth-wheel hitch assembly is essentially a large, flat plate that has a shape similar to a horseshoe and is adapted to couple to a trailer via a downward-facing pin on the trailer. A metal frame below the plate attaches to the chassis of the vehicle for strength.

The frames of the gooseneck and fifth-wheel hitch assemblies include fasteners or the like that are inserted into receivers disposed through the vehicle bed and appropriately secured to the vehicle chassis. In the event that a particular gooseneck or fifth-wheel hitch assembly needs to be removed from the bed or is otherwise not needed, the fasteners are loosened and the hitch assembly is removed from the bed. Plastic caps or plugs are then press-fit into or "popped in" to the receiver openings in an attempt to cover and/or protect the openings.

SUMMARY OF THE INVENTION

The inventors have discovered that the plastic caps currently being inserted into gooseneck and fifth-wheel hitch assembly receiver openings of vehicles are deficient in a number of regards. In one regard, the current plastic caps are not appropriately secured to the vehicle bed which results in the plastic caps being inadvertently removed from the receiver openings and allows for the introduction of moisture, debris and the like into the openings. For instance, heavy objects such as construction equipment and the like are often loaded onto and slide across the bed to an appropriate process. As such plastic caps are not rigidly secured to the vehicle bed, they often pop out of place or even break when objects are slid over the caps. Furthermore, the fact that such caps are fabricated of plastic further increase their susceptibility to inadvertent remove from the receiver openings and/or breakage. Still further, the current caps meet the vehicle bed at perpendicular angles which causes objects being slid thereover to catch or bind on the caps leading to their separation from the receiver openings.

In this regard, disclosed herein is a cap that is fabricated of any appropriate rigid material(s) (e.g., aluminum, other metals or composites, etc.) that is adapted to be inserted into one or more receiver openings (e.g., receiver openings for gooseneck and fifth-wheel hitch assemblies) in a vehicle bed and selectively secured to the bed to limit or inhibit the introduction of moisture, debris, or other elements into the receiver opening while facilitating the movement of objects (e.g., equipment, boxes) across the bed.

In one aspect, an apparatus that is adapted to be inserted into an opening in a vehicle bed and selectively secured thereto includes a rigid cap (e.g., constructed of metal such as aluminum, rigid composites, etc.) having opposed upper and lower surfaces and a central aperture extending between the upper and lower surfaces, first and second pins secured to the lower surface of the cap and extending substantially perpendicularly away therefrom, a clamping plate that is slidable along the first and second pins in a clamping direction towards the lower surface of the cap and in an opposed release direction away from the lower surface of the cap, and a fastener extending through the central aperture in the cap and into a threaded aperture in the clamping plate. Rotation of the fastener in opposed first and second rotational directions respectively induces sliding movement of the clamping plate in the clamping and release directions. Insertion of the clamping plate into the vehicle bed opening and rotation of the fastener in the first rotational direction clamps the cap and the clamping plate about the vehicle bed and conceals the vehicle bed opening with the cap, and rotation of the fastener in the second rotational direction loosens the cap and clamping plate and allows the apparatus to be released from the vehicle bed.

In another aspect, an apparatus that is adapted to be inserted into an opening in a vehicle bed and selectively secured thereto includes a cap having a central aperture, a resilient plug having opposed upper and lower surfaces and a central aperture extending therethrough, a clamping plate having opposed upper and lower surfaces and a threaded aperture extending therethrough, and a fastener extending into the central aperture in the cap, the central aperture of the resilient plug and the threaded aperture in the clamping plate. The cap includes a rigid cap body having opposed upper and lower surfaces and a rigid plug extending away from the lower surface of the cap body. Rotation of the fastener in a first rotational direction induces movement of the clamping plate towards the rigid plug to clamp the resilient plug therebetween and expand the resilient plug against an inner surface of the vehicle bed opening to secure the apparatus to the vehicle bed. Correspondingly, rotation of the fastener in an opposed second rotational direction induces movement of the clamping plate away from the rigid plug to release the resilient plug and allow the resilient plug to contract away from the inner surface of the vehicle bed opening and the apparatus to be released from the vehicle bed.

In some embodiments, the disclosed apparatuses may be included within hitch assembly kits for use in concealing and protecting vehicle bed receiver openings when the hitch assemblies are not in use. In other embodiments, the disclosed apparatuses may be included as part of a vehicle (e.g., they may come secured to the bed of a vehicle or as part of a towing kit that comes with the vehicle). The apparatuses may also be used as part of methods to conceal and protect vehicle bed openings, such as hitch receiver openings.

Various refinements may exist of the features noted in relation to the various aspects. Further features may also be incorporated in the various aspects. These refinements and additional features may exist individually or in any combination, and various features of the aspects may be combined. In addition to the exemplary aspects and embodiments described above, further aspects and embodiments will become apparent by reference to the drawings and by study of the following descriptions.

DESCRIPTION OF THE DRAWINGS

For a more complete understanding of the present invention and further advantages thereof, reference is now made to the following Detailed Description, taken in conjunction with the drawings, in which:

FIG. 2 is a sectional view through one of the receivers of FIG. 1.

FIGS. 3a-3d are various perspective views of a protective cap according to one embodiment.

DETAILED DESCRIPTION

Reference will now be made to the accompanying drawings, which assist in illustrating the various pertinent features of the various novel aspects of the present disclosure. In this regard, the following description is presented for purposes of illustration and description. Furthermore, the description is not intended to limit the inventive aspects to the forms disclosed herein. Consequently, variations and modifications commensurate with the following teachings, and skill and knowledge of the relevant art, are within the scope of the present inventive aspects.

Figure 1:
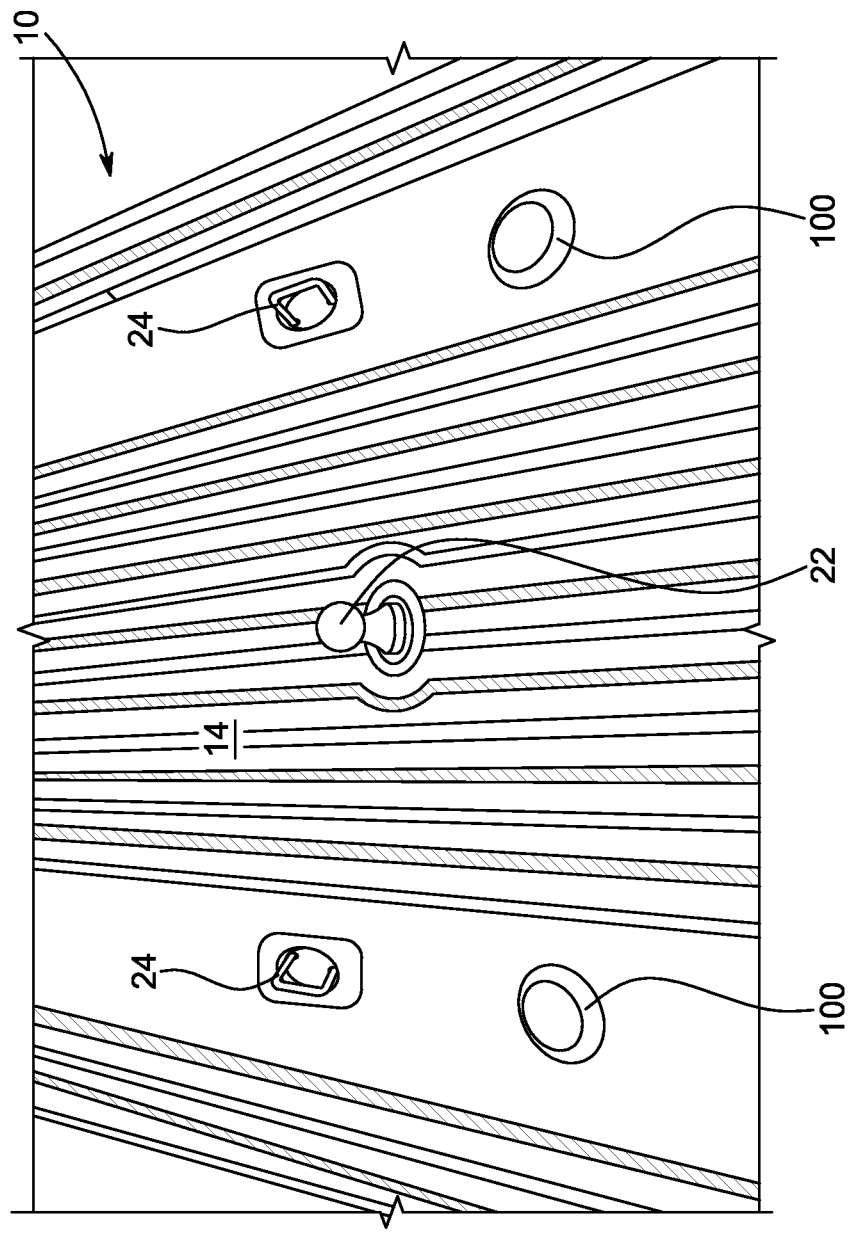
FIG. 1 is perspective view of a vehicle bed including a plurality of receivers that are adapted to receive hitch assemblies, where a protective cap as disclosed herein according to one embodiment is received in one of the openings and secured to the vehicle bed.

With initial respect to FIG. 1, a portion of a vehicle (e.g., pickup truck, etc.) bed 10 is illustrated having a floor 14 along with a plurality of upstanding sidewalls (not shown) extending away from the floor 14. The floor 14 may have a corrugated surface (as shown) and/or one or more other types of surfaces (e.g., diamond, smooth, etc.). The corrugated or other type of floor 14 may be formed by any appropriate bed liner (not labeled) that is appropriately laid over and secured to a subfloor of the vehicle bed 10 (although in some cases a bed liner may not be included in which case the floor 14 may be formed by the subfloor itself).

In any event, the floor 14 may include a plurality of receivers 18 (see FIG. 2) inserted therein that are adapted to respectively receive a plurality of fittings such as tie-downs 24, hitch assemblies (e.g., gooseneck hitch 22), and the like. With brief reference to FIG. 2, at least one receiver 18 may be in the form of a generally tubular member (e.g., cylindrical, square cross-section, etc.) having a receiver opening 26 extending therein from a top surface 30 of the receiver 18 to or at least towards a bottom surface (not shown) of the receiver 18. The receiver 18 may be inserted into an opening 23 extending into the floor 14 of the vehicle bed 10 and secured to the vehicle (e.g., subfloor, chassis, etc.) in any appropriate manner. While it appears there is a gap or space between the receiver 18 and the inner wall of the bed 14 surrounding the opening 23, there may in fact be no gap (i.e., the receiver 18 may be tightly received in the opening 23) or else the gap may be negligible.

When it is desired to remove a fitting from a particular receiver 18 (a fitting is not shown in FIG. 2) or when a particular receiver 18 is otherwise not in use, the fitting may be appropriately removed and the receiver 18 covered. Current manners of attempting to cover and protect the receiver from the elements include, inter alia, press fitting a plastic cap (not shown) into the receiver opening 26. However, and as discussed previously, such plastic caps are susceptible to breakage or popping out when objects are slid over them among other concerns due to their construction, the fact that they are not rigidly secured (e.g., clamped) to the vehicle, and the like.

In this regard, FIGS. 3a-3d and 4a illustrate an apparatus 100 that is adapted to be selectively inserted into a receiver opening 26 and secured to any appropriate portion of the vehicle bed 10 to cover the receiver 18 and limit or inhibit the introduction of moisture, debris, or other elements into the receiver opening, all while facilitating the movement of objects (e.g., equipment, boxes) across the floor 14. Broadly, the apparatus 100 includes a rigid cap 104 (e.g., constructed of metal(s), composites, etc.) having a cap body 108 with upper and lower surfaces 112, 116 and a central aperture 120 extending between the upper and lower surfaces. At least one slide pin such as first and second slide pins 124, 128 extend away from the lower surface 116 in a substantially perpendicular manner. For instance, the first and second slide pins 124, 128 may be spaced on opposing sides of the central aperture 120. In one arrangement, the cap body 108 may include a recess 132 within or formed as part of the lower surface 116 that is adapted to receive and conceal a portion of a receiver 18 protruding from the floor 14 (e.g., such as upper surface 30, see FIG. 3).

Figure 4A:
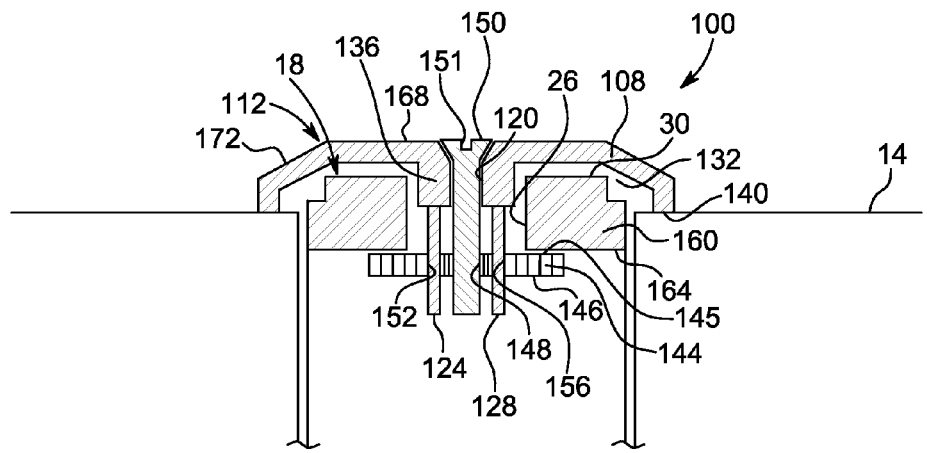
FIG. 4a is a sectional view of the protective cap of FIGS. 3a-3d being received within a receiver opening of FIG. 1, and showing a receiver lip under which a clamping plate of the protective cap of FIGS. 3a-3d can be disposed, where the clamping plate is an a disengaged position.
Figure 4B:
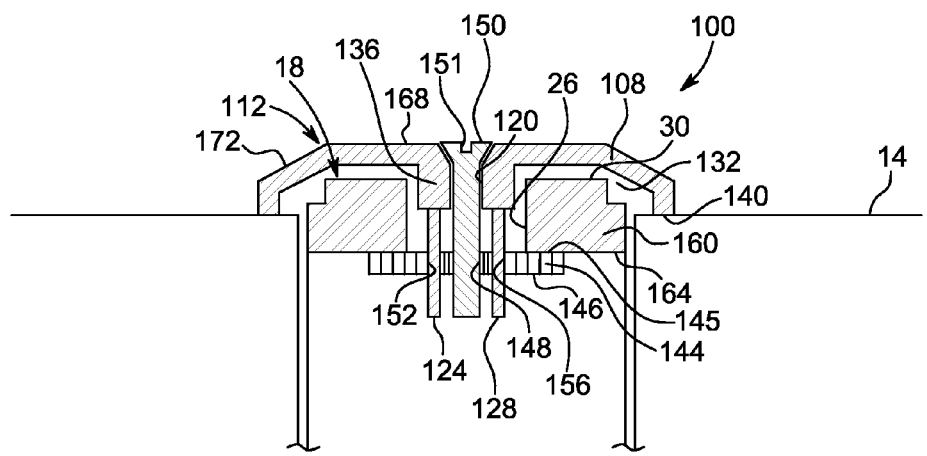
FIG. 4b is a sectional view similar to that in FIG. 4a, but with the clamping plate in an engaged position.

Additionally or alternatively, the cap 104 may also include a rigid plug 136 extending away from the lower surface 116 of the cap body 108 for use in centering the apparatus 100 over a receiver opening 26 and limiting lateral movement of the apparatus 100 relative to the floor 14 as will be discussed in more detail below. In one arrangement, the rigid plug 136 extends past an outer periphery 140 of the cap body 108. In other arrangements, the rigid plug 136 may extend just to the outer periphery 140 (as in FIG. 4) or short of the outer periphery 140. In any event, the central aperture 120 may extend through the cap body 108 as well as through the rigid plug 136. In one arrangement, the first and second slide pins 124, 128 may be secured to the rigid plug 136 and extend perpendicularly away therefrom.

The apparatus 100 also includes a clamping plate 144 having opposed upper and lower surfaces 145, 146 and that is generally operable to be selectively movable in a first, clamping direction towards the lower surface 116 of the cap body 108 and in an opposed second, release direction away from the lower surface 116 of the cap body 108. For instance, the clamping plate 144 may include a central (e.g., threaded) aperture 148 that is adapted to receive a (e.g., threaded) fastener 150. Additionally, the clamping plate 144 may include at least one slide aperture such as first and second slide apertures 152, 156 that are respectively adapted to slidably receive the first and second slide pins 124, 128. In this regard, rotation of the fastener 150 (e.g., via insertion of any appropriate tool into the head 151 of the fastener 150 and subsequent torquing) in a first rotational direction (e.g., clockwise or counterclockwise) serves to cause the clamping plate 144 to slide along the first and second slide pins 124, 128 in the clamping direction and rotation of the fastener 150 in an opposed, second rotational direction (e.g., the other of clockwise or counterclockwise) serves to cause the clamping plate 144 to slide along the first and second slide pins 124, 128 in the release direction.

To mount or secure the apparatus 100 to the vehicle bed 10, a user may first insert the clamping plate 144 into an opening in the vehicle bed 10 such as the receiver opening 26. See FIG. 4a. In one arrangement, a portion of the receiver opening 26 (e.g., a lower portion beneath the floor 14) may have a non-circular cross-section such as an oval cross-section, rectangular cross-section, and/or the like. The clamping plate 144 may thus have a shape (e.g., in plan) that substantially matches that of the cross-sectional shape of the receiver opening 26. In this regard, a user may need to appropriately align the clamping plate 144 with the receiver opening 26 to allow for insertion of the clamping plate 144 into the receiver opening 26.

For instance, the user may insert the clamping plate 144 into the receiver opening 26 until the cap body 108 is resting on the floor 14 of the vehicle bed 10 or is at least substantially adjacent the floor 14. Thereafter, the user may twist the entire apparatus 100 (e.g., via grasping and twisting the cap body 108) in a first twisting direction (e.g., about an axis extending through the length of the fastener 150) any appropriate angle (e.g., 90 degrees) so as to bring the clamping plate 144 underneath a lip 160 of the receiver 18 (e.g., as shown in FIG. 4). In this regard, it may be advantageous to ensure (e.g., before insertion of the clamping plate 144 into the receiver opening 26) that the distance between the cap body 108 and the clamping plate 144 is great enough to allow the clamping plate 144 to be twisted underneath the lip 160 once inserted into the receiver opening 26.

After the clamping plate 144 has been brought underneath the lip 160, the fastener 150 (i.e., as opposed to the entire apparatus 100) may be rotated in the first rotational direction to move the clamping plate 144 in the clamping direction until the upper surface 145 of the clamping plate 144 contacts a lower surface 164 of the lip 160. See FIG. 4b. At this point, the apparatus 100 is secured to the vehicle bed so as to limit the introduction of fluids, debris, and the like into the receiver opening 26 while providing a surface that facilitates sliding of objects and equipment over the floor 14. Specifically, the clamping of the cap body 108 and the clamping plate 144 about the floor 14 and the lip 160 limits movement of the apparatus 100 in directions normal to the floor 14. Furthermore, the rigid plug 136 may be sized and/or shaped to limit lateral movement of the apparatus 100 along the floor 14.

In one arrangement, the upper surface 112 of the cap body 108 may include a central planar portion 168 that is adapted to be generally parallel to and spaced from the vehicle bed 10 (e.g., spaced from the floor 14) when the apparatus 100 is secured to the vehicle bed 10, and an outer tapered portion 172 that is adapted to provide a ramping surface between the floor 14 and the central planar portion 168 when the apparatus 100 is secured to the vehicle bed. In this regard, objects being moved across the floor 14 may be gradually moved up the outer taped portion 172 to the central planar portion 168 and then down the outer tapered portion 172 instead of binding or catching on the apparatus 100 (e.g., as with previous caps). Furthermore, the recess 132 of the cap body 108 serves to receive and conceal portions of the receiver 18 that protrude from the floor 14 (e.g., such as top portion 30, see FIG. 4a).

To remove the apparatus 100 from the vehicle bed, the fastener 150 may first be rotated in the second rotational direction to move the clamping plate 144 in the release direction away from the cap body 108. Thereafter, the entire apparatus 100 may be twisted in a second, opposed twisting direction (e.g., by about 90 degrees) until the clamping plate 100 is no longer underneath the lip 160. At this point, the apparatus 100 may be removed from the receiver opening 26 (or other opening) and thus from the vehicle bed 10.

Figure 5A:
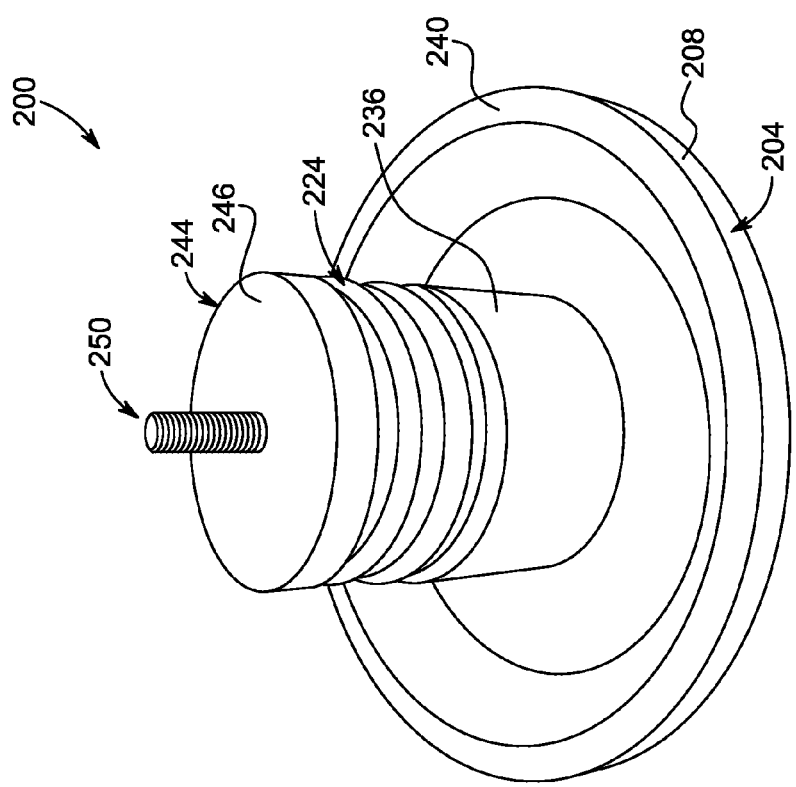
FIGS. 5a-5b are various perspective views of a protective cap according to another embodiment.
Figure 5B:
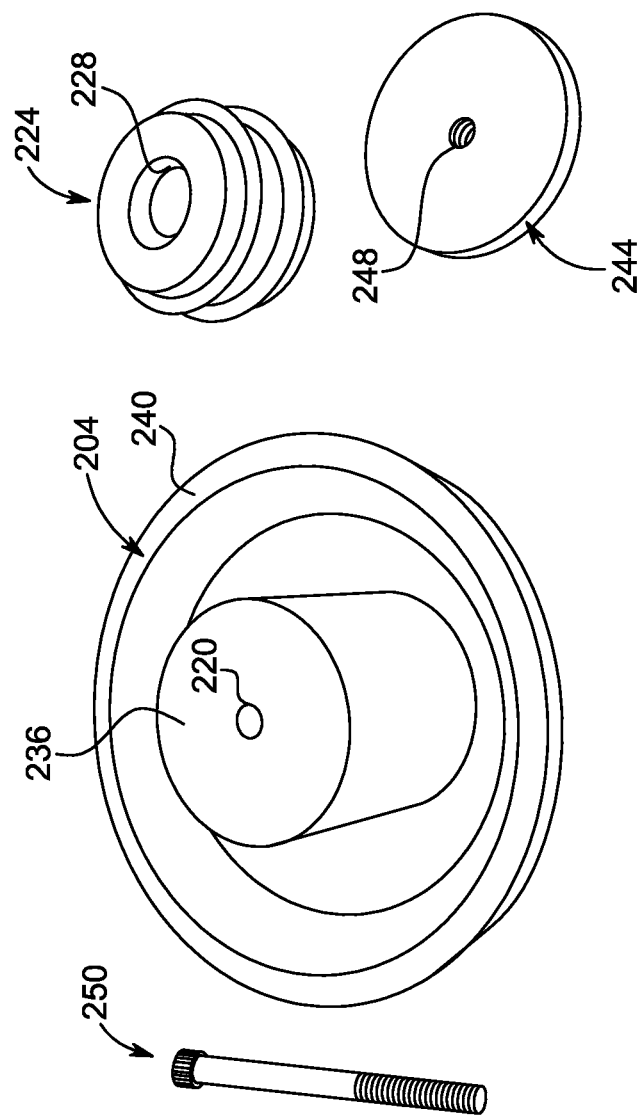
Figure 6A:
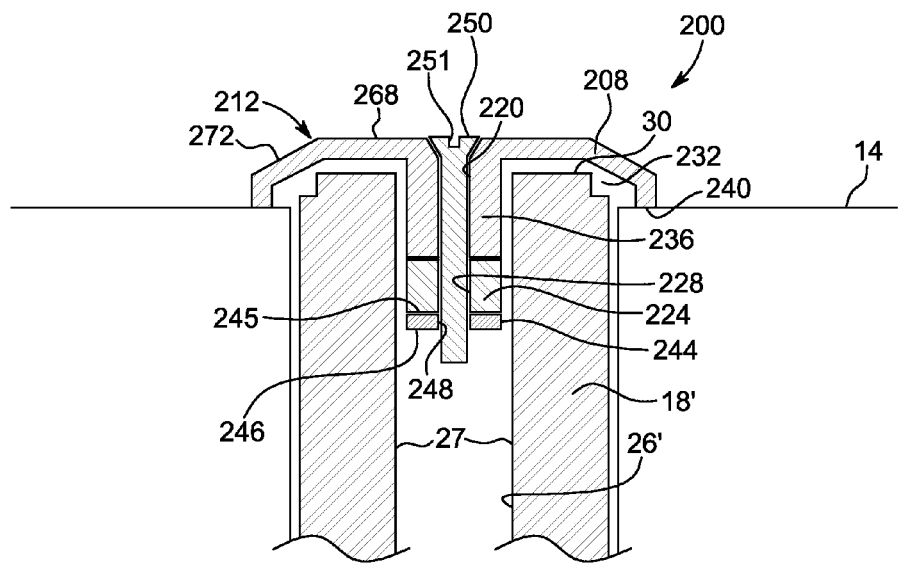
FIG. 6a is a sectional view of the protective cap of FIGS. 5a-5b being received within a receiver opening of FIG. 1, with a resilient plug of the cap being in a disengaged position.

With reference now to FIGS. 5a-5b and 6a, another embodiment of a protective cap apparatus 200 is shown. Broadly, the apparatus 200 includes a rigid cap 204 (e.g., constructed of metal(s), composites, etc.) having a cap body 208 with upper and lower surfaces 212, 216 and a central aperture 220 extending between the upper and lower surfaces. The cap 204 also includes a rigid plug 236 extending away from the lower surface 216 of the cap body 208 for use in centering the apparatus 200 over the opening 26' of a receiver 18' and limiting lateral movement of the apparatus 200 relative to the floor 14 as will be discussed in more detail below. In one arrangement, the rigid plug 236 extends past an outer periphery 240 of the cap body 208. In other arrangements, the rigid plug 236 just to the outer periphery 240 or short of the outer periphery 240. In any event, the central aperture 220 may extend through the cap body 208 as well as through the rigid plug 236.

The apparatus 200 may include a resilient plug 224 (e.g., fabricated of a cylindrical piece of rubber) having a central aperture 228, a clamping plate 244 having a central (e.g., threaded) aperture 248 (along with upper and lower surfaces 245, 246), and a (e.g., threaded) fastener 250 that is adapted to be inserted through and received in the central apertures 220, 228, 248 of the cap body 208, resilient plug 224, and clamping plate 244, respectively. Rotation of the fastener 250 in a first rotational direction (e.g., clockwise or counterclockwise) induces movement of the clamping plate 244 (along the fastener 250) towards the rigid plug 236 in a clamping direction to clamp and compress the resilient plug 224 therebetween and expand the resilient plug 224 outwardly against and into tight contact with an inner surface 27 of the receiver opening 26' (or other opening in the floor 14) to secure the apparatus 200 to the vehicle bed 10. Rotation of the fastener 250 in an opposed second rotational direction (e.g., the other of clockwise or counterclockwise) induces movement of the clamping plate 244 away from the rigid plug 236 in a release direction to release the resilient plug 224 and allow the resilient plug 224 to contract away from the inner surface 27 and the apparatus 200 to be released from the vehicle bed 10.

Figure 6B:
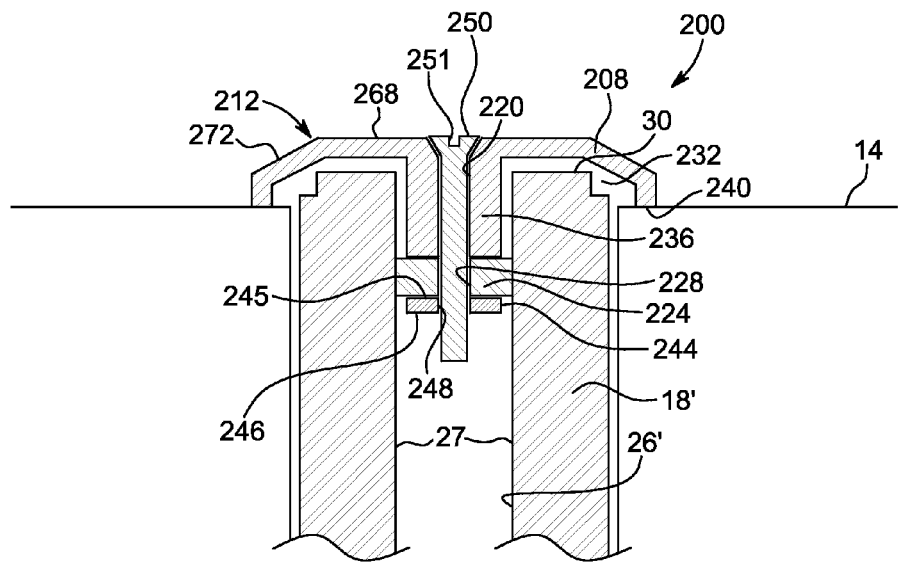
FIG. 6b is a sectional view similar to that in FIG. 6a, but with the resilient plug in an engaged position.

To mount or secure the apparatus 200 to the vehicle bed 10, a user may first insert the clamping plate 244 into an opening in the vehicle bed 10 such as a receiver opening 26'. See FIG. 6a. In one arrangement, the clamping plate 244 may have a shape (e.g., in plan) that substantially matches that of the cross-sectional shape of the receiver opening 26' (e.g., circular). In any event, the user may insert the clamping plate 244 into the receiver opening 26' until, for instance, the cap body 208 is resting on the floor 14 of the vehicle bed 10 or is at least substantially adjacent the floor 14 (e.g., so that the outer periphery 240 is in contact with the floor 14. Thereafter, the fastener 250 may be rotated in the first rotational direction to move the clamping plate 244 in the clamping direction to cause the clamping plate 244 to compress the resilient plug 224 against the rigid plug 236 so that the resilient plug 224 expands outwardly against and contacts the inner surface 27 to secures the apparatus 200 against movement relative to the floor 14. See FIG. 6b.

At this point, the apparatus 200 is secured to the vehicle bed so as to limit the introduction of fluids, debris, and the like into the receiver opening 26' while providing a surface that facilitates sliding of objects and equipment over the floor 14. Specifically, expansion of the resilient plug 224 against the inner surface 27 limits movement of the apparatus 200 in directions normal to the floor 14. Furthermore, the rigid plug 236 may be sized and/or shaped to limit lateral movement of the apparatus 200 along the floor 14 (e.g., such as being sized and/or shaped to match a cross-sectional shape of the receiving opening 26').

Like the apparatus 100, the upper surface 212 of the cap body 208 may include a central planar portion 268 that is adapted to be generally parallel to and spaced from the vehicle bed 10 (e.g., spaced from the floor 14) when the apparatus 200 is secured to the vehicle bed 10 and an outer tapered portion 272 that is adapted to provide a ramping surface between the floor 14 and the central planar portion 268 when the apparatus 200 is secured to the vehicle bed to limit binding or catching of objects being moved across the floor 14 over the apparatus 200. Also, the recess 232 of the cap body 208 serves to receive and conceal portions of the receiver 18' that protrude from the floor 14 (e.g., such as top portion 30, see FIG. 6a).

To remove the apparatus 200 from the vehicle bed 14, the fastener 250 may first be rotated in the second rotational direction to move the clamping plate 244 in the release direction away from the rigid plug 236 and cap body 208 and allow the resilient plug 224 to contract or otherwise pull away from the inner surface of the receiver opening 26'. Thereafter, the apparatus 200 may be removed from the receiver opening 26' (or other opening) and thus from the vehicle bed 10.

Furthermore, the description is not intended to limit the invention to the form disclosed herein. Consequently, variations and modifications commensurate with the above teachings, and skill and knowledge of the relevant art, are within the scope of the present invention. As one example, while the disclosed apparatuses have been discussed in the context of providing a protective cover over vehicle bed receiver openings, it is envisioned that the apparatuses could also be used as tie-downs within vehicle beds that can allow rope, loops, chains and the like to be secured thereto. For instance, any appropriate rigid hook or look could protrude from the upper surface of the cap or cap body to function as a tie-down.

As another example, while the disclosed apparatuses have been disclosed as being inserted into and over receivers (e.g., receivers 18, 18') that are in turn inserted within openings in a vehicle floor or sidewall, the disclosed apparatuses may also be inserted into and over openings directly in the floor or sidewall. As a further example, any of the disclosed apparatuses could be included in various kits with other componentry or the like. For instance, one or more of the disclosed apparatuses could be provided as a standard feature with a vehicle or could be purchased as an add-on feature or aftermarket feature. In another arrangement, one or more of the disclosed apparatuses could be provided in a kit with one or more of various types of fittings (e.g., with gooseneck hitch assemblies, fifth wheel hitch assemblies, tie-downs, and/or the like).

While this disclosure contains many specifics, these should not be construed as limitations on the scope of the disclosure or of what may be claimed, but rather as descriptions of features specific to particular embodiments of the disclosure. Certain features that are described in this specification in the context of separate embodiments and/or arrangements can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The embodiments described hereinabove are further intended to explain best modes known of practicing the invention and to enable others skilled in the art to utilize the invention in such, or other embodiments and with various modifications required by the particular application(s) or use(s) of the present invention. It is intended that the appended claims be construed to include alternative embodiments to the extent permitted by the prior art.

What is claimed is:

1. An apparatus that is adapted to be inserted into an opening in a vehicle bed and selectively secured thereto, the apparatus comprising:
    a rigid cap comprising opposed upper and lower surfaces and a central aperture extending between the upper and lower surfaces;
    first and second pins secured to the lower surface of the cap and extending substantially perpendicularly away therefrom;
    a clamping plate that is slidable along the first and second pins in clamping direction towards the lower surface of the cap and in an opposed release direction away from the lower surface of the cap; and
    a fastener extending through the central aperture in the cap and into a threaded aperture in the clamping plate, wherein rotation of the fastener in opposed first and second rotational directions respectively induces sliding movement of the clamping plate in the clamping and release directions, wherein insertion of the clamping plate into the vehicle bed opening and rotation of the fastener in the first rotational direction clamps the cap and the clamping plate about the vehicle bed and conceals the vehicle bed opening with the cap, and wherein rotation of the fastener in the second rotational direction loosens the cap and clamping plate and allows the apparatus to be released from the vehicle bed.

2. The apparatus of claim 1, wherein the cap further comprises a cap body and a plug extending away from the cap body, wherein the central aperture extends through the plug, and wherein the plug is insertable into the vehicle bed opening to limit lateral movement of the apparatus relative to the vehicle bed.

3. The apparatus of claim 2, wherein the first and second pins are secured to the plug.

4. The apparatus of claim 2, wherein the cap body further comprises a recess surrounding the plug, wherein the recess is adapted to conceal a receiver protruding from the vehicle bed opening.

5. The apparatus of claim 1, wherein the cap body further comprises a recess within the lower surface, wherein the recess is adapted to conceal a receiver protruding from the vehicle bed opening.

6. The apparatus of claim 1, wherein the upper surface of the cap comprises a central planar portion and an outer tapered portion, wherein the central planar portion is adapted to be generally parallel to and spaced from the vehicle bed when the apparatus is secured to the vehicle bed, and wherein the outer tapered portion is adapted to provide a ramping surface between the vehicle bed and the central planar portion when the apparatus is secured to the vehicle bed.

7. A method, comprising:
inserting the clamping plate of the apparatus of claim 1 into an opening through a top surface of a vehicle bed and past a lip of the opening; and
first rotating the fastener in the first rotational direction to respectively clamp the cap and the clamping plate against the top surface and the lip, wherein the vehicle bed opening is concealed by the cap.

8. The method of claim 7, further comprising after the inserting step and before the rotating step:
twisting the apparatus to bring the clamping plate under the lip.

9. The method of claim 7, further comprising before the inserting:
removing a hitch assembly from the vehicle bed opening.

10. The method of claim 9, wherein the hitch assembly comprises a gooseneck or fifth-wheel hitch assembly.

11. The method of claim 7, further comprising after the first rotating step:
second rotating the fastener in the second rotational direction to respectively loosen the cap and the clamping plate from the top surface and the lip; and
removing the apparatus from the vehicle bed opening.

12. The method of claim 11, further comprising after the second rotating step and before the removing step:
twisting the apparatus so that the clamping plate is not disposed under the lip.

13. The method of claim 11, further comprising after the removing:
inserting a hitch assembly into the vehicle bed opening; and
securing the hitch assembly to the vehicle.

14. A vehicle, comprising:
a bed;
an opening disposed at least partially through the bed; and
the apparatus of claim 1 inserted into the opening and clamped to the bed.

15. An apparatus that is adapted to be inserted into an opening in a vehicle bed and selectively secured thereto, the apparatus comprising:
a cap including:
a rigid cap body having opposed upper and lower surfaces;
a rigid plug extending away from the lower surface of the cap body; and
a central aperture extending through the rigid cap and rigid plug;
a resilient plug having opposed upper and lower surfaces and a central aperture extending therethrough;
a clamping plate having opposed upper and lower surfaces and a threaded aperture extending therethrough; and
a fastener extending into the central aperture in the cap, the central aperture of the resilient plug and the threaded aperture in the clamping plate, wherein rotation of the fastener in a first rotational direction induces movement of the clamping plate towards the rigid plug to clamp the resilient plug therebetween and expand the resilient plug against an inner surface of the vehicle bed opening to secure the apparatus to the vehicle bed, and wherein rotation of the fastener in an opposed second rotational direction induces movement of the clamping plate away from the rigid plug to release the resilient plug and allow the resilient plug to contract away from the inner surface of the vehicle bed opening and the apparatus to be released from the vehicle bed.

16. The apparatus of claim 15, wherein the cap body further comprises a recess surrounding the plug, wherein the recess is adapted to conceal a receiver protruding from the vehicle bed opening.

17. The apparatus of claim 15, wherein the upper surface of the cap body comprises a central planar portion and an outer tapered portion, wherein the central planar portion is adapted to be generally parallel to and spaced from the vehicle bed when the apparatus is secured to the vehicle bed, and wherein the outer tapered portion is adapted to provide a ramping surface between the vehicle bed and the central planar portion when the apparatus is secured to the vehicle bed.

18. A method, comprising:
inserting the clamping plate of the apparatus of claim 16 into an opening through a top surface of a vehicle bed; and
first rotating the fastener in the first rotational direction to expend the resilient plug against an inner surface of the opening to secure the apparatus to the vehicle bed, wherein the vehicle bed opening is concealed by the cap.

19. The method of claim 18, further comprising after the first rotating step:
second rotating the fastener in the second rotational direction to respectively contract the resilient plug from the inner surface of the vehicle bed opening; and
removing the apparatus from the vehicle bed opening.

20. A vehicle, comprising:
a bed;
an opening disposed at least partially through the bed; and
the apparatus of claim 15 inserted into the opening and secured to the bed.

* * * * *